(12) United States Patent
Demirbas et al.

(10) Patent No.: US 9,725,349 B2
(45) Date of Patent: Aug. 8, 2017

(54) GLASS MANUFACTURING APPARATUS AND METHODS

(71) Applicants: Memduh Demirbas, Horseheads, NY (US); Ralph Alfred Langensiepen, Corning, NY (US); David Myron Lineman, Painted Post, NY (US); Christopher Charles Tournour, Horseheads, NY (US); Randy Dean Ziegenhagen, Elmira, NY (US)

(72) Inventors: Memduh Demirbas, Horseheads, NY (US); Ralph Alfred Langensiepen, Corning, NY (US); David Myron Lineman, Painted Post, NY (US); Christopher Charles Tournour, Horseheads, NY (US); Randy Dean Ziegenhagen, Elmira, NY (US)

(73) Assignee: Corning Incorporated, Corning, NY (US)

( * ) Notice: Subject to any disclaimer, the term of this patent is extended or adjusted under 35 U.S.C. 154(b) by 59 days.

(21) Appl. No.: 13/687,189

(22) Filed: Nov. 28, 2012

(65) Prior Publication Data
US 2014/0144183 A1    May 29, 2014

(51) Int. Cl.
*C03B 5/43* (2006.01)
*C03B 7/02* (2006.01)
(Continued)

(52) U.S. Cl.
CPC .......... *C03B 5/43* (2013.01); *C03B 5/16* (2013.01); *C03B 5/1675* (2013.01); *C03B 5/225* (2013.01); *C03B 7/02* (2013.01); *C04B 35/101* (2013.01); *C04B 35/106* (2013.01); *C04B 35/18* (2013.01); *C04B 35/482* (2013.01); *C04B 35/484* (2013.01); *C04B 35/66* (2013.01); *C03B 17/064* (2013.01); *C04B 2235/3206* (2013.01); *C04B 2235/3208* (2013.01);
(Continued)

(58) Field of Classification Search
CPC    C03B 5/425; C03B 5/43; C04B 35/48; C04B 35/482; C04B 35/484; C04B 35/66
USPC ................................................. 501/103, 104
See application file for complete search history.

(56) References Cited

U.S. PATENT DOCUMENTS 2,293,089 A  *  8/1942  Wainer ............................ 52/612
2,876,121 A  *  3/1959  Ault .............................. 501/103
(Continued)

FOREIGN PATENT DOCUMENTS

EP         0328316        8/1989
EP         0951453        8/2004
(Continued)

OTHER PUBLICATIONS

JP 2005-298277—Machine Language Translation—Accessed at PAJ on Jun. 8, 2014 (http://www4.ipdl.inpit.go.jp/Tokujitu/PAJdetail.ipdl?N0000=60&N0120=01&N2001=2&N3001=2005-298277).*
(Continued)

*Primary Examiner* — Jason L Lazorcik
(74) *Attorney, Agent, or Firm* — John L. Haack (57) ABSTRACT

Low-carbon monolithic refractories are provided. Methods of manufacturing glass employing low-carbon monolithic refractories are also provided. Methods and apparatuses for glass manufacture for reducing the formation of carbon dioxide blisters during glass manufacture are also provided.

17 Claims, 3 Drawing Sheets

(51) Int. Cl.

| | | |
|---|---|---|
| *C04B 35/101* | (2006.01) | |
| *C04B 35/106* | (2006.01) | |
| *C04B 35/18* | (2006.01) | |
| *C04B 35/482* | (2006.01) | |
| *C04B 35/484* | (2006.01) | |
| *C04B 35/66* | (2006.01) | |
| *C03B 5/16* | (2006.01) | |
| *C03B 5/167* | (2006.01) | |
| *C03B 5/225* | (2006.01) | |
| *C03B 17/06* | (2006.01) | |

(52) U.S. Cl.
CPC ............... *C04B 2235/3222* (2013.01); *C04B 2235/3225* (2013.01); *C04B 2235/443* (2013.01); *C04B 2235/5427* (2013.01); *C04B 2235/5436* (2013.01); *C04B 2235/5472* (2013.01); *C04B 2235/721* (2013.01)

(56) References Cited

U.S. PATENT DOCUMENTS

| | | | | |
|---|---|---|---|---|
| 3,533,815 | A | * | 10/1970 | Baldwin ................. 501/105 |
| 4,018,858 | A | * | 4/1977 | Walters et al. ............ 501/102 |
| 4,360,598 | A | * | 11/1982 | Otagiri et al. ............. 501/103 |
| 4,504,591 | A | * | 3/1985 | Feagin ................ B22C 1/183 164/361 |
| 4,506,023 | A | * | 3/1985 | Guigonis ................. 501/104 |
| 4,659,610 | A | | 4/1987 | George et al. |
| 4,722,915 | A | * | 2/1988 | Soma et al. .............. 501/103 |
| 4,742,030 | A | * | 5/1988 | Masaki et al. ............. 501/105 |
| 4,789,651 | A | * | 12/1988 | Sugie ................ C04B 35/486 264/669 |
| 4,891,343 | A | * | 1/1990 | Quadair ................. 501/103 |
| 5,004,039 | A | * | 4/1991 | Feagin ................ B22C 1/183 164/361 |
| 5,275,759 | A | * | 1/1994 | Osaka et al. ................ 516/90 |
| 5,320,675 | A | * | 6/1994 | Dransfield et al. .......... 106/450 |
| 5,776,397 | A | * | 7/1998 | Kuroda et al. .............. 264/161 |
| 5,785,726 | A | | 7/1998 | Dorfeld et al. |
| 5,976,445 | A | * | 11/1999 | Kuroda et al. ............. 264/297.4 |
| 6,121,177 | A | * | 9/2000 | Guigonis et al. ........... 501/105 |
| 7,021,082 | B2 | | 4/2006 | Hoyer et al. |
| 7,032,412 | B2 | | 4/2006 | Dorfeld et al. |
| 7,129,192 | B2 | * | 10/2006 | Boussant-Roux et al. ... 501/105 |
| 7,386,999 | B2 | | 6/2008 | Fenn et al. |
| 7,628,038 | B2 | | 12/2009 | DeAngelis et al. |
| 7,628,039 | B2 | | 12/2009 | DeAngelis et al. |
| 7,854,144 | B2 | | 12/2010 | DeLamielleure et al. |
| 7,874,179 | B2 | | 1/2011 | Rue et al. |
| 8,109,118 | B2 | | 2/2012 | Watanabe et al. |
| 8,114,188 | B1 | | 2/2012 | Goller et al. |
| 8,124,554 | B2 | * | 2/2012 | Boussant-Roux et al. ... 501/103 |
| 8,127,572 | B2 | | 3/2012 | Dorfeld et al. |
| 8,177,114 | B2 | | 5/2012 | Dorfeld et al. |
| 8,196,434 | B2 | | 6/2012 | Pitbladdo |
| 8,303,702 | B2 | * | 11/2012 | Von Rymon Lipinski et al. .................. 106/286.4 |
| 2007/0149380 | A1 | | 6/2007 | Dorfeld et al. |
| 2009/0272150 | A1 | * | 11/2009 | Kotacska et al. .......... 65/374.12 |
| 2010/0068492 | A1 | * | 3/2010 | Boussant-Roux et al. ... 428/220 |
| 2010/0199721 | A1 | | 8/2010 | Antoine et al. |
| 2011/0098171 | A1 | | 4/2011 | Pedeboscq et al. |
| 2012/0073326 | A1 | | 3/2012 | Dorfeld et al. .................. 65/27 |
| 2012/0103021 | A1 | | 5/2012 | Antoine et al. |

FOREIGN PATENT DOCUMENTS

| | | |
|---|---|---|
| JP | H1067570 | 3/1998 |
| JP | 2005298277 | 10/2005 |

OTHER PUBLICATIONS

English Language Translation of JP 10-067570.*
English Language Translation of JP 2005-298277.*
Birkby (Birkby, I., Stevens, R., "Applications of Zirconia ceramics", Key Engineering Materials, vols. 122-124 (1996) pp. 527-552).*
International Search Report and Written Opinion, dated May 8, 2014, International Application No. PCT/US2013/071401, dated Nov. 22, 2013.
Technical Ceramics page (available at http://www.morgantechnicalceramics.com/materials/zirconia-zro2—downloaded Jul. 29, 2016.
Wikipedia page for "refractory", available at https://en.wikipedia.org/wiki/Refractory—downloaded Jul. 29, 2016.

* cited by examiner

FIG. 3

GLASS MANUFACTURING APPARATUS AND METHODS

FIELD

The present disclosure relates generally to glass manufacturing apparatus and methods and, more particularly, to a monolithic refractory comprising a low-carbon refractory material. The present disclosure also relates to a glass manufacturing apparatus with a refractory assembly comprising a low-carbon monolithic refractory, and methods of reducing blistering during a glass manufacturing process.

BACKGROUND

Precision glass manufacturing is intended to deliver high quality glass for the manufacture of optical lenses and glass panels for use in display devices such as televisions, computers, cell phones and other flat panel display uses. An example technique for manufacturing these glass sheets employs supported vessels including refractory/precious metal materials, such as platinum or platinum alloys, among others.

Despite recent advances to improve glass manufacturing technologies, blister defects in the glass sheets continue to be a significant proportion of the overall melt defects generated in display glasses. In particular, blister defects generated during unit startup have remained prevalent. Accordingly, improvements in the glass manufacturing technologies that reduce the occurrence of these blisters defects in glass would be useful.

SUMMARY

The following provides a basic understanding of some example aspects of the disclosure.

In accordance with a first aspect there is a monolithic refractory including a low-carbon refractory material optionally having a low-carbon organic or inorganic binder, wherein the low-carbon refractory material can have a total carbon content of less than 1 wt. %. Further, the refractory material can include at least 96 wt. % of a zirconia component. In another example, the low-carbon refractory material can include at least 98 wt. % of a zirconia component.

In one example of the first aspect, the total carbon content of the low-carbon monolithic refractory can be less than 0.5 wt. %. In other examples of the first aspect, the low-carbon refractory material can be essentially free of carbon. In another example, the low-carbon material is carbon free.

In another example of the first aspect, the low-carbon refractory material includes a calcium aluminate cement.

In another example of the first aspect, the low-carbon refractory material includes a low-carbon organic or inorganic binder, such as at least one material of the following group, calcium aluminate, zirconium nitrate, calcium nitrate, magnesium nitrate, yttrium nitrate, and combinations thereof. In another example of the first aspect, the low-carbon refractory material can include zirconium acetate present in an amount up to 4 wt. % of the total refractory.

In another example of the first aspect, the monolithic refractory is a castable refractory, a component of a glass manufacturing system or a method of manufacturing glass that includes passing a molten glass through a monolithic refractory having a low-carbon refractory material.

The first aspect of the disclosure can be provided alone or in combination with any one or any combination of the examples of the first aspect discussed above.

In accordance with a second aspect, a glass manufacturing apparatus can include a molten glass transport vessel having a glass contact surface, wherein the molten glass transport vessel transports molten glass through the glass manufacturing apparatus. The glass manufacturing apparatus can further include a refractory assembly having a low-carbon refractory material optionally having a low-carbon organic or inorganic binder, wherein the low-carbon refractory material can have a total carbon content of less than 1 wt. %. Further, the refractory material can include at least 96 wt. % of a zirconia component. In another example, the low-carbon refractory material can include at least 98 wt. % of a zirconia component.

In one example of the second aspect, the total carbon content of the low-carbon refractory material is less than 0.5 wt. %.

In another example of the second aspect, the low-carbon refractory material includes a low-carbon organic or inorganic binder, wherein the binder is zirconium nitrate being present in an amount up to 4 wt. % of the total refractory material.

In still another example of the second aspect, the glass manufacturing apparatus further includes a second refractory at least partially encasing the low-carbon monolithic refractory. In one example, the second refractory provides a cradle for at least part of the glass manufacturing system. In one example, the compositions of the low-carbon monolithic refractory and the second refractory are substantially similar.

The second aspect of the disclosure can be provided alone or in combination with any one or any combination of the examples of the second aspect discussed above.

In accordance with a third aspect of the present disclosure is a method of manufacturing glass. The method includes the step of applying an oxidizing atmosphere to a transport vessel of a glass manufacturing apparatus while the glass manufacturing apparatus is heated to an operating temperature. The method further includes the step of at least partially removing carbon from a location along the transport vessel with the oxidizing atmosphere to reduce the level of carbon at a location. The method can further include the step of flowing a molten glass through the transport vessel of the glass manufacturing apparatus.

In one example of the third aspect, applying the oxidizing atmosphere includes exposure of the oxidizing atmosphere to a refractory assembly of the glass manufacturing system. In still another example of the third aspect, applying the oxidizing atmosphere utilizes an atmosphere with at least 20% by volume oxygen. In still another example of the third aspect, applying the oxidizing atmosphere includes adding an oxygen-containing compound to a refractory material.

The third aspect of the disclosure can be provided alone or in combination with any one or any combination of the examples of the third aspect discussed above.

BRIEF DESCRIPTION OF THE DRAWINGS

In embodiments.

DETAILED DESCRIPTION

Examples will now be described with references to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

"Essentially free of" is used to include unavoidable levels of impurities but no more, for example, less than 0.1 wt. % as measured by the total content of a refractory material.

Aspects of the present disclosure may be used to produce glass sheets that can be used, for example, in display applications, for example, liquid crystal displays (LEDs), electrophoretic displays (EPD), organic light emitting diode displays (OLEDs), plasma display panels (PDPs), or the like. Glass sheets produced with aspects of the present disclosure can be obtained from a glass ribbon formed from a forming apparatus, which can be used to form the glass ribbon using various techniques such as slot draw, float, down-draw, fusion down-draw, fusion up-draw, or other glass ribbon forming techniques. The glass ribbon can then be subsequently divided to provide glass sheets suitable for further processing into a desired application. Aspects of the present disclosure can also be used in other kinds of glass production, e.g., for the production of shapes, tubing, bulbs, plates, cups, dishes, lenses, etc.

Figure 1:
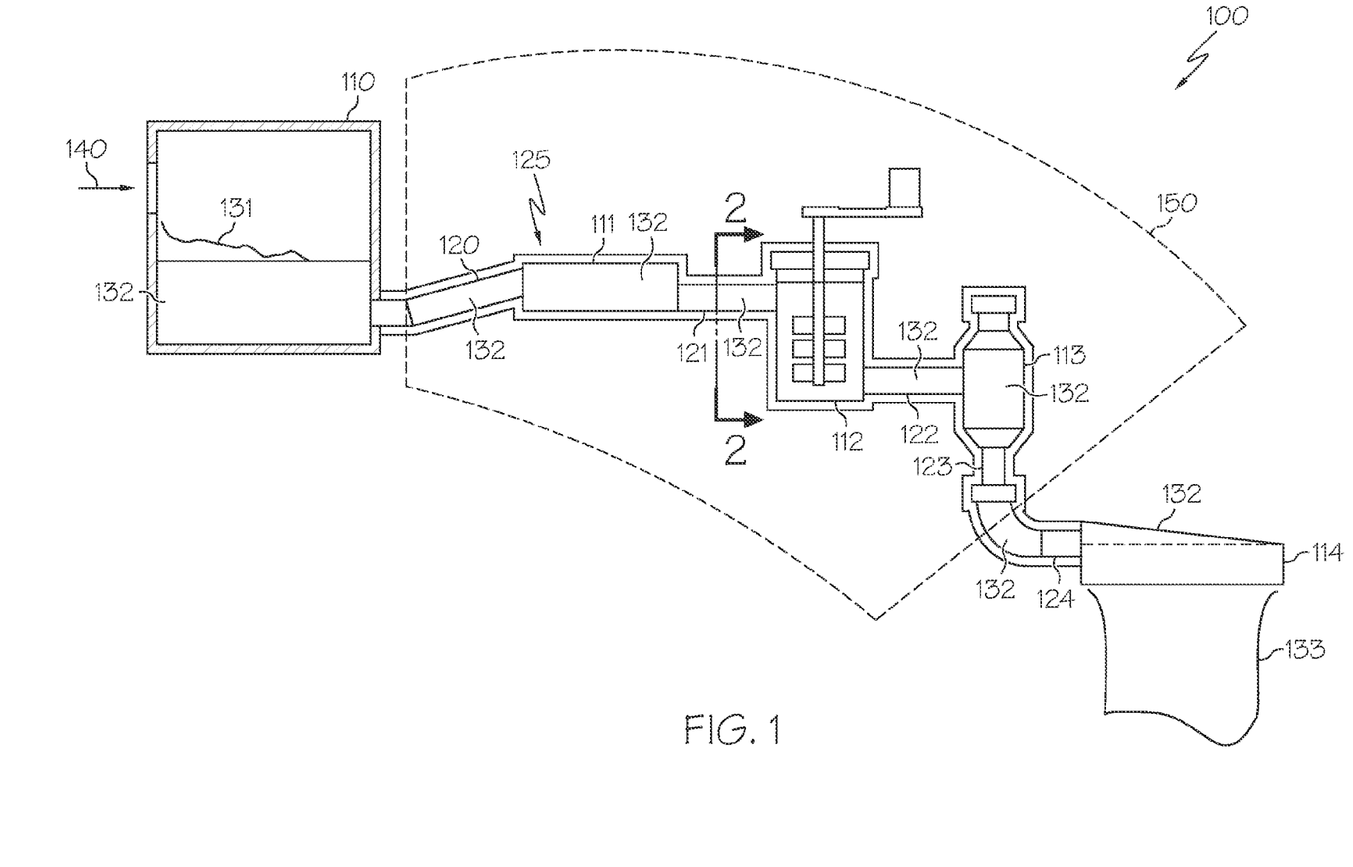
FIG. 1 is a side view of a glass making apparatus.

FIG. 1 is a side view of a glass making apparatus 100 having a melting furnace or melter 110, a finer 111, a stirring apparatus 112, a collection vessel 113, and a downcomer tube 123 for supplying molten glass to a forming body 114 for producing a ribbon of glass 133. The finer 111 is connected to the melter 110 through a melter to finer connecting tube 120 and to the stirring apparatus through connector tube 121. The stirring apparatus 112 is connected to the collection vessel 113 through connector tube 122. The downcomer tube 123 is connected to a collection vessel 113 and supplies molten glass 132 to an inlet 124 connected to the forming body 114. The melter 110 is typically constructed from a refractory material, such as alumina or zirconia, and is supplied with batch material 131 that is melted by, for example, a gas flame, an electric current passed between electrodes, or both, in the melter structure. Similarly, forming body 114 is also typically formed from a refractory material. In this instance, the glass manufacturing apparatus 100 comprises a downdraw system, so named because molten glass (glass melt) 132 delivered to the forming body 114 overflows both sides of the forming body 114 as separate flows, then rejoins or fuses downstream near, at the bottom of the forming body, or both, as the molten glass 132 is drawn downward by pulling rollers to produce a ribbon of glass 133. The ribbon may be cut at the bottom of the draw into individual glass sheets.

In an example of the fusion glass making apparatus described above, raw batch materials 131 can be sourced to the melting furnace (as indicated by arrow 140) where heat is applied to melt the individual constituents of the batch to form flowable molten glass 132. The batch materials typically include various metal oxides and other additives as required for a specific glass composition. The melter 110 can be formed from a refractory material, for example, refractory bricks. The melting process produces, inter alia, various gases that can become entrained in the molten glass. It is desirable to remove or substantially reduce the amount of entrained gasses in the molten glass to produce a high quality product formed from the molten mixture. Thus, a fining step can be included. For example, the molten glass can be flowed from the melter 110 through connecting tube 120 to finer 111, where the temperature of the glass is raised. The increased temperature both decreases the viscosity of the molten glass, and causes certain fining agents (e.g. tin oxide) included in the batch material to release gas, e.g. oxygen. The gas released by the fining agent can combine with existing gas bubbles, causing them to grow and therefore, rise through and exit the glass melt faster. Fining is achieved when bubbles rise to a free surface of the molten glass and escape or exit from the melt. Once the molten glass has been fined, the molten glass is flowed through connecting tube 121 to the stirring apparatus 112 and is stirred to achieve a homogenous glass melt composition. After sufficient stirring, the molten glass flows from the stirring apparatus 112 through connecting tube 122 to collection vessel 113, then through the downcomer tube 123 to inlet 124 of the forming body 114. It should be noted, however, that the forming process of the present disclosure can be replaced with other forming processes.

In an example of the disclosure a glass manufacturing apparatus includes a molten glass transport vessel composed of a precious metal or alloy thereof. The vessel can be configured to provide a glass contact surface, wherein the molten glass transport vessel transports molten glass through the glass manufacturing apparatus. The glass manufacturing apparatus can further include a refractory assembly including a low-carbon refractory material having at least 96 wt. % of a zirconia component. In other examples, the low-carbon refractory material can be a zirconia component present in at least 97 wt. %, 98 wt. %, 99 wt. % or more of the total refractory. As used herein, a "zirconia component" includes any refractory zirconia material suitable for use in a monolithic refractory. For example, a zirconia component may be fused zirconia, zirconia grain, fused zirconia grain, zirconia powder or any combination thereof. The zirconia of the zirconia component can be of any grain or mesh size as called for by a particular application. The low-carbon refractory material optionally can include a low-carbon organic or inorganic binder.

In certain examples, fused zirconia grain can be present in an amount ranging from 10 to 80 wt. %, 20 to 70 wt. %, 30 to 60 wt. % or 40 to 50 wt. %, including intermediate values and ranges. The fused zirconia grain can be of any mesh suitable for the application, e.g., 8 M to 28 M, wherein "M" is mesh size. The low-carbon refractory material can contain, either alone or in combination with the fused zirconia grain, zirconia grain, present in an amount of from 10 to 40 wt. %, or 20 to 30 wt. %. The zirconia grain can be of any mesh suitable for the application, e.g., 100 M. The low-carbon refractory material can contain, either alone or in combination with the fused zirconia grain. zirconia grain or both, zirconia powder of any grain suitable for the application (e.g., 200 M), wherein the zirconia powder is present in an amount from 10 to 40 wt. %, or 20 to 30 wt. %. Herein, when a range such as 5 to 25 wt. % is given, this means at least 5 or not less than 5 and, separately and independently, not more than or less than 25. In an example, such a range can define independently not less than 5, and separately and independently, not more than 25. Values with such a range, for example 10, 15, or 20, are also separately and independently included in the same manner at the lower and upper end values of the disclosed range.

"Molten glass transport vessel" refers to any precious metal-containing component of a glass manufacturing system that is used in the melting, fining, delivery, or forming processes for glass manufacturing. The molten glass transport vessel is configured to provide a glass contact surface wherein the molten glass transport vessel transports molten glass through the glass manufacturing apparatus. The vessel can be any of the finer 111, the stirring apparatus 112, the collection vessel 113, the downcomer tube 123, the inlet 124, the connecting tubes 120, 121, and 122, or both, and additionally or alternatively any other component of a glass manufacturing system comprising a precious metal. Each of these components is formed from a precious metal, including but not limited to platinum, palladium, rhodium, iridium, gold, osmium, molybdenum, rhenium, tantalum, titanium, tungsten, or alloys thereof, including ternary alloys. Moreover, while the present disclosure is presented in the context of the exemplary precious metal systems introduced above, the principals and teachings of the present disclosure are applicable any time a precious metal-containing component is included in a glass manufacturing system.

"Refractory assembly" refers to and can include any part of a glass manufacturing system wherein a refractory material encases a glass manufacturing vessel, transport vessel, or portion thereof. Refractory assembly can include a monolithic refractory. Example components that may be included in a refractory assembly are depicted in the illustrative example set forth in FIG. 1, and can include any of the finer 111, the stirring apparatus 112, the collection vessel 113, the downcomer tube 123, the inlet 124, the connecting tubes 120, 121, and 122, or combinations thereof, and additionally or alternatively any other component of a glass manufacturing system comprising a path through which glass or molten glass travels. In some examples, a transport vessel is encased or partially encased by a refractory assembly. In other examples, a transport vessel is substantially or fully encased by a refractory assembly. In yet other examples, the refractory assembly may be either inside or outside of a vessel. In some examples, the refractory assembly may be in contact with the transport vessel. In other examples, there may be another layer of the glass manufacturing system between the transport vessel and the refractory assembly.

FIG. 1 further schematically illustrates an example refractory assembly 125 at least partially encasing vessels of the glass manufacturing apparatus 100. The illustrated refractory assembly 125 at least partially encases the finer 111, the stirring apparatus 112, the collection vessel 113, the downcomer tube 123, the inlet 124, the connecting tubes 120, 121, and 122, or combinations thereof. Although not shown, in further examples, the refractory assembly 125 can at least partially encase only a single vessel or a combination of vessels less than all of the vessels. In still further examples, the refractory assembly 125 can at least partially encase additional vessels not featured in the illustrated example.

Figure 2:
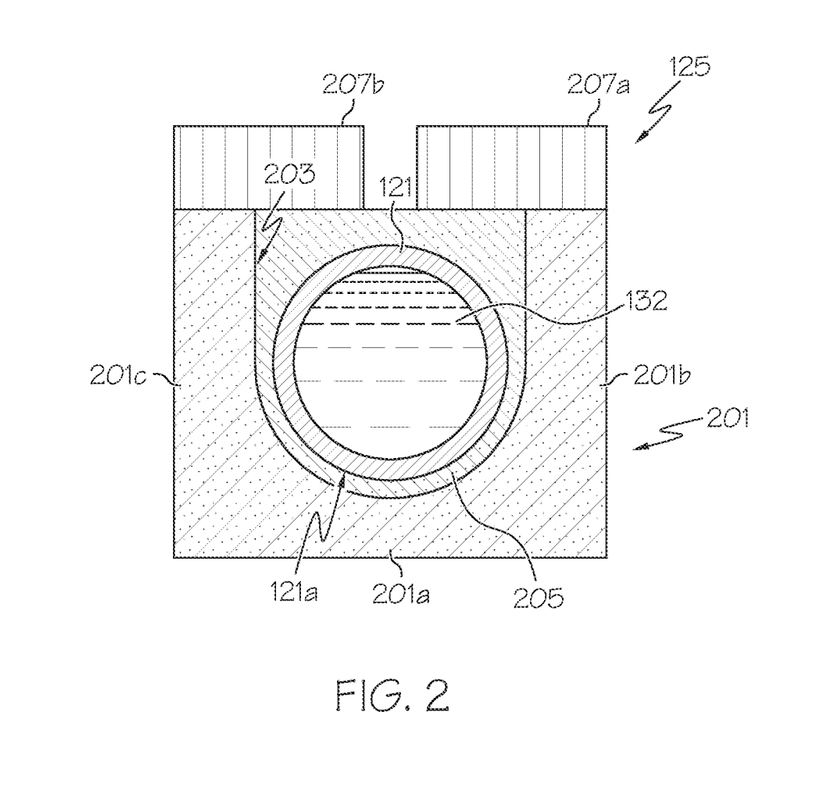
FIG. 2 is a cross sectional view of the glass making apparatus along line 2-2 of FIG. 1.

FIG. 2 is a cross-sectional view of a section of the refractory assembly 125 with the understanding that other configurations can be used. The refractory assembly 125 can include an optional cradle 201 including a base 201a and two sidewalls 201b, 201c that can extend upwards from the base 201a. The base 201a and two sidewalls 201b, 201c can be formed together as a unitary body such that the cradle 201 comprises a single-piece cradle that can be made by melting zirconia powder to obtain a zirconia melt, then casting the melt in a mold to form the cradle 201. The connecting tube 121 (or other vessel) can be at least partially inserted within the channel of the cradle 201. In use, molten glass 132 may travel along the travel path defined by the connecting tube 121. In some examples, as shown, the molten glass 132 may entirely fill the interior area of the connecting tube 121 although the molten glass may not fill the entire chamber in some examples. For instance, in some examples of the finer 111, the molten glass will only partially fill the interior area of the finer 111. Turning back to FIG. 2, the refractory assembly 125 can also include a cast cement 205 disposed between the internal surface 203 of the channel of the cradle and the external surface 121a of the connecting tube 121. As shown, the cast cement 205 can completely encase the connecting tube 121 although the cast cement 205 may only partially encase the connecting tube 121 in further examples. As shown, the cradle 201 and cast cement 205 can provide mechanical support for the connecting tube 121 or other vessel and provide thermal insulation. In further examples, the cradle 201 can be further covered by cover members 207a, 207b that may also comprise refractory material.

A conventional glass manufacturing apparatus employs a monolithic refractory that includes an organic binder with a relatively high amount of carbon, which can undesirably contribute carbon to the monolithic refractory. For example, a zirconium acetate binder of $Zr(CH_3COO)_2$ comprises about 23 wt. % carbon. A zirconium acetate binder employing $Zr(CH_3COO)_4$ comprises about 30 wt. % carbon. It has now been determined that when the system is heated to a temperature suitable for glass manufacturing, typically greater than 1450° C., carbon-containing components, such as an carbon-containing organic binder, decompose, thereby generating carbon char that is able to permeate the precious metal transport vessels and be available for carbon dioxide blister formation at the surface of the molten glass. The disclosure provides an improvement over conventional refractory use for precious metal transport vessels in a glass manufacturing apparatus. The improvement involves a low-carbon monolithic refractory that affords lower levels of carbon decomposition, thereby limiting the amount of carbon available for carbon dioxide blister formation, which in turn reduces undesirable blistering during the glass manufacturing process. At least portions of the refractory assembly 125 can include a low-carbon monolithic refractory. For example, the low-carbon monolithic refractory can comprise the cast cement 205, the cradle 201, or both. If provided, the cover members 207a, 207b may likewise comprise a low-carbon monolithic refractory.

In some aspects of the disclosure, the formation of carbon dioxide blisters at the interface between the vessel and the molten glass are reduced. In some aspects, the formation of carbon dioxide blisters at the interface between the vessel and the molten glass will be substantially reduced, inhibited, or prevented.

"Low-carbon monolithic refractory" or "low-carbon refractory material" refers to a refractory with a sufficiently low total carbon content so as to reduce the formation of carbon dioxide blisters at an interface between the vessel and the molten glass. The total carbon content of the refractory includes the total carbon contribution from each of a base of a refractory material or combination of refractory materials plus a binder and any other additives present in the monolithic refractory. In one example of the disclosure, the total carbon content of the low-carbon monolithic refractory can be less than 1.0 wt. %. In other examples, the total carbon content of the low-carbon monolithic refractory can be less than 0.8, 0.6, 0.5, 0.4, 0.3, 0.2, or 0.1 wt. %, including intermediate values and ranges. In other examples of the disclosure, the monolithic refractory can be essentially free of carbon or carbon free.

In certain examples, the refractory material can be highly refractory in addition to having a low-carbon content. In some examples, the monolithic refractory can be essentially insoluble when exposed to the high temperature fluid inside the vessel. In certain examples, the refractory material includes zirconia. In other examples, the refractory material can include alumina, sillimanite, or both, either alone or in combination with zirconia. In certain examples, the monolithic refractory is a castable refractory such as the cast cement 205 discussed above. In yet further examples, the monolithic refractory can be the cradle 201 (e.g., as discussed above). In still further examples, the low-carbon refractory material can include a calcium aluminate cement. The calcium aluminate cement can be present up to 2 wt. %, 1.5 wt. % or 1 wt. %. The calcium aluminate cement can be present in less than 1 wt. % in some examples, such as 0.5 wt. % or 0.1 wt. %.

In some aspects of the disclosure, the low-carbon monolithic refractory includes an optional low-carbon organic or inorganic binder. In some aspects of the disclosure, the binder can be present at less than 7 wt. % of the total refractory material. In other aspects, the binder is present in less than 6 wt. %, less than 5 wt. %, less than 4 wt. %, less than 3 wt. %, less than 2 wt. %, and less than 1 wt. % of the total refractory material. In some aspects of the disclosure, no binder is present in the refractory. Additionally, in some aspects, the binder is a low-carbon organic binder. In some aspects, the binder is an inorganic binder. In some aspects of the disclosure, the binder is essentially free of carbon or is carbon-free. Binders suitable for use in the present disclosure include any low-carbon organic or inorganic compound with the ability to bind the refractory. Example binders according to the present disclosure include calcium aluminate, zirconium nitrate, calcium nitrate, magnesium nitrate, yttrium nitrate and combinations thereof, among others.

In certain examples, the low-carbon refractory may include other additives. In some aspects, the low-carbon refractory material can include magnesium oxide (MgO). The MgO may be of any size suitable for the application, such as fused MgO, 200 M. In certain examples, the low-carbon refractory may include a dispersant, such as an organic dispersant. Other non-organic dispersants may also be employed according to the current disclosure. Such dispersants according to the present disclosure may be present in an amount up to 1.0 wt. %. In other examples, such dispersants can be present in an amount up to 0.8 wt. %, up to 0.6 wt. %, up to 0.4 wt. %, or up to 0.2 wt. %. Certain aspects can comprise an organic or non-organic dye present in an amount of up to 1, up to 0.8, up to 0.6, up to 0.4, or up to 0.2 wt. %. In other examples, the low-carbon refractory material can include an anti-forming agent present in an amount of up to 1, up to 0.8, up to 0.6, up to 0.4, or up to 0.2 wt. %.

In certain examples, the refractory assembly can include one or more refractories. For instance, the refractory assembly can include a low-carbon monolithic refractory at least partially encasing the vessel, inside of the vessel, or both. In another example, the refractory assembly further includes a second refractory at least partially encasing the low-carbon monolithic refractory. In certain aspects, the second refractory can be a hard fused cast cradle refractory. In examples of the disclosure, the compositions of the low-carbon monolithic refractory and the second refractory are similar, substantially similar, or the same.

In certain examples a method of manufacturing glass includes passing a molten glass through the described low-carbon monolithic refractory. The method of manufacturing can be any method (e.g., fusion draw) practiced in the art.

Figure 3:
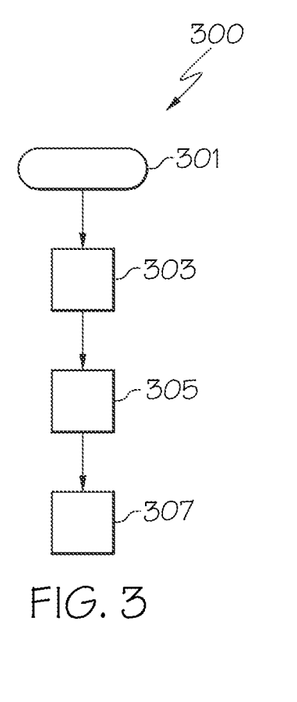
FIG. 3 is a is a flow chart of steps for a method of manufacturing glass.

FIG. 3 illustrates a method 300 for manufacturing glass beginning at step 301. The method 300 includes the step 303 of applying an oxidizing atmosphere to a transport vessel of a glass manufacturing apparatus while the glass manufacturing apparatus is heated to an operating temperature. The operating temperature may be higher than 1450° C., higher than 1500° C., higher than 1550° C., higher than 1600° C., or higher than 1650° C. The method further includes the step 305 of at least partially removing carbon from a location along the transport vessel with the oxidizing atmosphere to reduce the level of carbon at the location. The method can further include the step 307 of flowing a molten glass through the transport vessel of the glass manufacturing apparatus.

The glass manufacturing apparatus, including the refractory assembly, can be brought to operating temperature before the molten glass is introduced to the delivery system. In some glass manufacturing systems, the full length of the precious metal-containing components, from the melter exit tube 120 to the exit of the downcomer 123 is encapsulated in an automatic control device 150, such as a control chamber, designed to control the oxygen content to low levels. This system is normally not operational during system heat up, but the mostly closed atmospheric control chamber does limit the availability of fresh air. This creates a reducing atmosphere surrounding the finer and refractory assembly, which combined with the high operating temperatures, supports the decomposition of any organic carbon present in the refractory, thereby forming a carbon char within the porous refractory. It has now been determined that without sufficient oxygen available, the char can permeate the precious metal vessels to be available for carbon dioxide blister formation following the introduction of molten glass. The present method can include the step 303 of applying an oxidizing atmosphere to the travel path of the glass manufacturing apparatus, including at least part of the length from the melter exit tube 120 to the downcomer 123. Without wishing to be bound by theory, it is believed that introduction of an oxidizing atmosphere into environment surrounding the refractory during system startup can have the dual function of flushing any residual organic decomposition to remove excess carbon that may be present, and providing some ability to oxidize carbon residue that forms before it can penetrate the vessel alloy. The effect is to reduce the carbon content available for alloy contamination, thereby reducing the potential for carbon dioxide blister generation at the alloy and glass melt interface.

In certain examples, the oxidizing atmosphere is applied to a travel path of the glass manufacturing apparatus. In other examples, the oxidizing atmosphere is applied to the refractory assembly of the glass manufacturing system.

In certain examples, the oxidizing atmosphere is applied with at least 20% by volume oxygen in the atmosphere. In one example, the oxidizing atmosphere is applied by ambient air. Alternatively, the atmosphere can contain greater than at least 20% by volume oxygen, such as 25%, 30%, 35%, 40%, 45%, 50%, 60%, 70%, 80%, 90% or up to 100% oxygen, including intermediate values and ranges.

In some aspects of the disclosure, the atmospheric control device 150 can be configured to provide an oxidizing atmosphere to the travel path of the glass manufacturing system. In some examples, the atmospheric control device could be configured to allow flowing ambient air or oxygen into the system during system heat up. In further examples, the oxidizing atmosphere can be provided by a pipe incorporated into the environment surrounding the refractory to allow ambient air or oxygen to penetrate the refractory. In another example, the pipe can be incorporated into the refractory itself to allow deeper penetration of ambient air or oxygen.

In yet another example, the oxidizing atmosphere can be provided by incorporating an oxygen-containing compound into the refractory material. Without wishing to be bound by theory, it is believed that with a traditional refractory comprising an organic binder, an insufficient amount of oxygen is produced to react with the carbon resulting from the binder decomposition. For example, the decomposition of zirconium acetate ($Zr(CH_3COO)_2$ or $Zr(CH_3COO)_4$) generates an extra mol of carbon for every mol of $CO_2$ produced. This leftover carbon results in the formation of carbon char, which can in turn penetrate the precious metal and form carbon dioxide blisters at the surface of the molten glass. However, by incorporating an oxygen-containing compound into the refractory, the decomposition of the oxygen-containing compound will provide an infusion of oxygen that would be available to react with the remaining carbon to form carbon dioxide. Because the carbon dioxide gas is released from the refractory without penetrating the vessel, the method thereby prevents the formation of carbon char, and thus, inhibits the formation of undesirable carbon dioxide blisters at the molten glass interface. An example oxygen-containing compound according to the present aspect is a nitrate-containing compound, such as ammonium nitrate.

Figure 4:
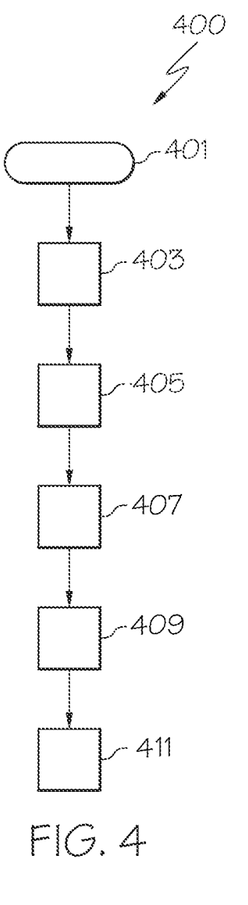
FIG. 4 is a flow chart of steps for a method of manufacturing glass.

FIG. 4 depicts a method 400 of making a component of a glass manufacturing apparatus beginning with step 401. The method includes the step 403 of providing a low-carbon refractory material including carbon present up to 1% based on the total weight of the refractory material. The method additionally includes the step 405 of adding at least one of a low-carbon organic or inorganic binder and/or water to the refractory component material. The method additionally includes the step 407 of mixing the low-carbon refractory material and the low-carbon binder, water, or both, to form a low-carbon refractory premix. The method additionally includes the step 409 filling the low-carbon refractory premix into a space surrounding a vessel, such as a transport vessel, or the space inside a vessel made from a precious metal or alloy thereof. The method additionally includes the step 411 of providing heat to set the low-carbon refractory premix.

The method of FIG. 4 can be used to form a low-carbon castable refractory. The refractory material can be any highly refractory material with low-carbon content. In one example, the total carbon content of the refractory is less than 1 wt. %. In still another example, the refractory is essentially free of carbon. In some examples, the refractory is carbon free. In certain examples, the refractory material can be zirconia. In other examples, the refractory material can include alumina, sillimanite, or both, either alone or in combination with zirconia.

In an example method, the refractory is provided as a dry powder component. The dry refractory component can be formed in to a low-carbon premix by mixing the dry powder refractory component with a liquid binder and/or water. In some embodiments, the binder is a low-carbon organic or inorganic compound known to one skilled in the art to bind the refractory. Example binders according to the present method can include calcium aluminate, zirconium nitrate, calcium nitrate, magnesium nitrate, yttrium nitrate, and combinations thereof, among others. In some embodiments, the dry powder refractory component can be mixed with water without an additional binder. This results in a refractory that maintains the same casting characteristics as a refractory containing a binder, but has a much reduced total carbon content.

Once the low-carbon dry refractory component and the binder, water, or both, are mixed, the premix can be cast into the space surrounding a vessel in the glass manufacturing system. In an alternative example, the premix can be cast into the space inside a vessel. To ensure complete filling of the space surrounding the vessel, vibrations or other techniques known to those skilled in the art can be applied to remove air bubbles, spread the premix, etc. Once cast, the premix may set partially at room temperature. To fully set the premix, the method includes the step of providing heat to set the low-carbon refractory premix.

Carbon contamination in the stirring apparatus that gives rise to carbon dioxide blisters via carbon permeating through the platinum vessels and reacting with oxygen at the platinum and melt interface is well established, while other potential areas of high carbon concentration in close proximity to the platinum system have heretofore gone unrecognized.

Herein, it is recognized that the monolithic refractory used in the current glass manufacturing systems contains an organic binder that can readily decompose at the high operating temperatures (1600+° C.) of the glass manufacturing assembly. After decomposition, the resulting carbon residue can be deposited onto a transport vessel, such as a platinum system, under reducing atmospheric conditions, thereby forming carbon dioxide blisters at the molten glass and platinum interface. The present disclosure provides a solution to limit such carbon deposition, and hence, reduce or eliminate blistering due to carbon permeation.

To promote a further understanding of the disclosure, the following examples are provided. These examples are shown by way of illustration and not limitation.

Examples of monolithic refractories are provided in Table 1 below. The comparative example of Table 1 is a zirconium acetate-containing refractory traditionally used in the art. Examples 1 and 2 are low-carbon refractories. Example 3 is an example of a carbon-free refractory according to the present disclosure. Values of each component are provided in wt. % of the total refractory.

TABLE 1

| Component | Comparative Example (wt. %) | Example 1 (wt. %) | Example 2 (wt. %) | Example 3 (wt. %) |
|---|---|---|---|---|
| fused zirconia grain, 8M | — | — | — | ≤40 |
| fused zirconia grain, 28M | ≤40 | ≤40 | ≤40 | ≤20 |
| zirconia grain, 100M | ≤30 | ≤30 | ≤30 | ≤20 |
| zirconia powder, 200M | ≤30 | ≤30 | ≤30 | ≤20 |
| fused MgO, 200M | 1 | 1 | — | — |
| zirconium acetate | 4.8 | — | — | — |
| zirconium nitrate | — | — | 4 | — |
| calcium aluminate cement | — | 2 | — | 1 |
| organic dispersant | 0.1 | 0.1 | 0.1 | — |
| organic dye | <0.1 | — | — | — |
| organic anti-foam agent | <0.1 | — | — | — |

As can be seen in Table 1, a low-carbon or carbon free refractory can be provided by reducing or eliminating the content of carbon-containing components, such as an organic binder conventionally used in glass manufacturing apparatuses. The refractory of Examples 1 and 3 contains no organic binder, such as zirconium acetate, whereas Example 2 contains an inorganic binder, zirconium nitrate.

The disclosure has been described with reference to the example embodiments described above. It will be apparent to those skilled in the art that various modifications and variations can be made without departing from the scope of the claims of the disclosure.

What is claimed is:
1. A glass manufacturing apparatus comprising:
   a molten glass transport vessel comprising a glass contact surface; and
   a refractory assembly comprising a monolithic refractory composition at least partially encasing the molten glass transport vessel, the monolithic refractory composition comprising at least 98 wt. % zirconia and an inorganic binder, and the monolithic refractory composition having a total carbon content of less than 1 wt. %.

2. The glass manufacturing apparatus of claim 1, wherein the inorganic binder is selected from the group consisting of calcium aluminate, zirconium nitrate, calcium nitrate, magnesium nitrate, yttrium nitrate, and combinations thereof.

3. The glass manufacturing apparatus of claim 2, wherein the inorganic binder comprises zirconium nitrate present in an amount up to 2 wt. % of the total refractory composition.

4. The glass manufacturing apparatus of claim 1, wherein the total carbon content of the monolithic refractory composition is less than 0.5 wt. %.

5. The glass manufacturing apparatus of claim 4, wherein the monolithic refractory composition is essentially free of carbon.

6. The glass manufacturing apparatus of claim 1, further comprising a second refractory at least partially encasing the monolithic refractory composition.

7. The glass manufacturing apparatus of claim 6, wherein the second refractory provides a cradle for at least part of the glass manufacturing apparatus.

8. The glass manufacturing apparatus of claim 6, wherein the compositions of the monolithic refractory and the second refractory are substantially the same.

9. The glass manufacturing apparatus of claim 1, wherein the monolithic refractory composition is in contact with the one or more precious metal molten glass manufacturing vessels.

10. The glass manufacturing apparatus of claim 1, further comprising a layer of cast cement disposed between the precious metal molten glass manufacturing vessel and the monolithic refractory composition.

11. The glass manufacturing apparatus of claim 10, wherein the compositions of the monolithic refractory and the cast cement are substantially the same.

12. The glass manufacturing apparatus of claim 1, wherein the monolithic refractory composition has a unitary body substantially surrounding the molten glass transport vessel, wherein the unitary body is in contact with the molten glass transport vessel.

13. The glass manufacturing apparatus of claim 1, the monolithic refractory composition further comprising an additive.

14. The glass manufacturing apparatus of claim 13, wherein the additive is magnesium oxide.

15. A glass manufacturing apparatus comprising:
a molten glass transport vessel comprising a glass contact surface; and
a refractory assembly comprising a monolithic refractory composition at least partially encasing the molten glass transport vessel, the monolithic refractory composition comprising at least 96 wt. % zirconia and an inorganic binder, and the monolithic refractory composition having a total carbon content of less than 1 wt. %.

16. The glass manufacturing apparatus of claim 15, the monolithic refractory composition further comprising an additive.

17. The glass manufacturing apparatus of claim 16, wherein the additive is magnesium oxide.

* * * * *

UNITED STATES PATENT AND TRADEMARK OFFICE
CERTIFICATE OF CORRECTION

| | | |
|---|---|---|
| PATENT NO. | : 9,725,349 B2 | Page 1 of 1 |
| APPLICATION NO. | : 13/687189 | |
| DATED | : August 8, 2017 | |
| INVENTOR(S) | : Memduh Demirbas et al. | |

It is certified that error appears in the above-identified patent and that said Letters Patent is hereby corrected as shown below:

On the Title Page

In Column 2, item (56), Other Publications, Line 2, delete "www4." and insert -- www. --, therefor.

Signed and Sealed this
Third Day of May, 2022

Katherine Kelly Vidal
*Director of the United States Patent and Trademark Office*